March 21, 1939.   W. SANDER   2,151,566
NONSKID CAP FOR BICYCLE DYNAMOS
Filed Feb. 5, 1938
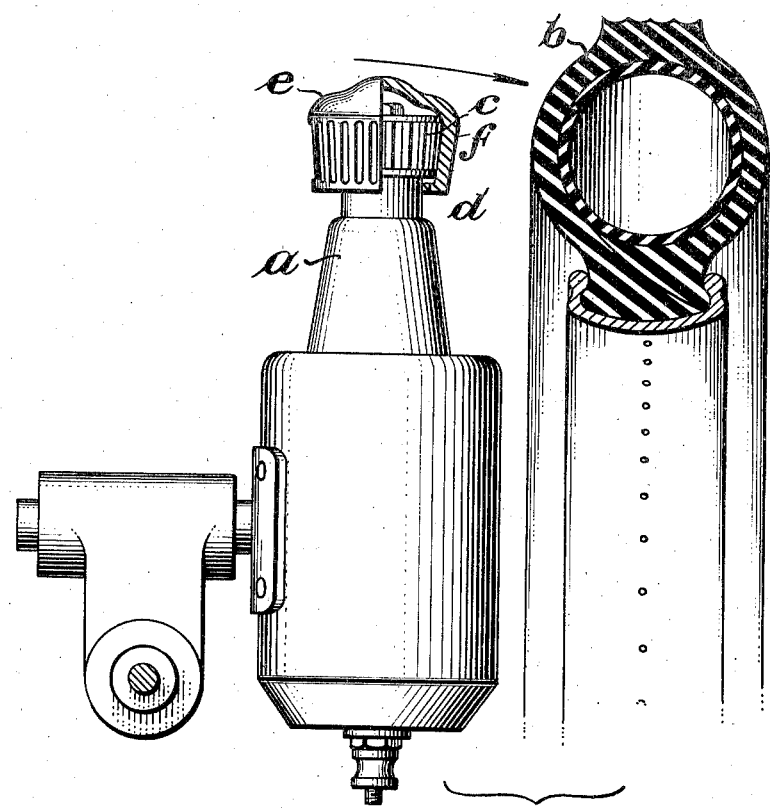
Inventor:
Wilhelm Sander
by Ferd. Nunch
Attorney Patented Mar. 21, 1939

2,151,566

UNITED STATES PATENT OFFICE 2,151,566

NONSKID CAP FOR BICYCLE DYNAMOS

Wilhelm Sander, Zwickau, Saxony, Germany

Application February 5, 1938, Serial No. 188,967
In Germany February 25, 1937

1 Claim. (Cl. 74—215)

For the light production on bicycles dynamo-machines are used, the fluted metallic driving wheel of which contacts on the bicycle tire during the time the current for the electric bulb has to be produced by the rapid rotations.

The metallic driving wheel rubs then on the rubber tire so that the latter is at this point submitted to wear. Sliding and skidding of the driving wheel is unavoidable, especially in wet weather, wherefrom results, owing to the irregular current production, flickering of the light, which might cause accidents if the light on the bicycle extinguishes suddenly even only temporarily. In wet, cold weather a smooth ice layer is formed on the driving wheel by the rapid rotations of the metallic driving wheel so that it must skid on the rubber tire. The light on the bicycle burns irregularly and, when the driving wheel is worn, full exploitation of the source of electric energy can never take place so that the light is only very feeble.

All these inconveniences are obviated according to the invention which consists in a non-skid cap of rubber or other suitable material which is fluted in the inner and outer sides and stretched over the metallic driving wheel, the dynamo being accordingly adjusted on the fork. A lower inwardly turned edge of the cap then ensures the conical cap against slipping off, whereas a hood-like head allows to stretch the cap for covering the fixation nut on the driving wheel. The internal flutes engage over the teeth of the driving wheel and act as catches so that slipping of the cap on the metallic driving wheel is impossible even if the cap should expand or get loose in the course of time.

The non-skid cap is illustrated on the accompanying drawing in cooperation with the dynamo and with the bicycle.

The dynamo $a$ is, as usual, hingedly fixed on the side of the bicycle, so that for the time when electric light is wanted, the metallic driving wheel $c$ can be brought into contact with the outer cover $b$ of the pneumatic tire of the bicycle. In order to avoid the metallically hard action of the driving wheel, a rubber cap $f$ is stripped in known manner over this driving wheel $c$, said cap having flutes on the outer and inner side and an inwardly turned lower edge $d$. In order that sufficient material is available for placing the cap on the driving wheel, the cap has the form of a hood $e$. If the dynamo, which has been adjusted in accordance with the slightly enlarged circumference of the driving wheel is brought into the driving position, the rubber-driving wheel presses into the rubber of the cover of the pneumatic tire and rotation of the driving wheel is ensured, as the resilient pressing-on of the driving wheel can be regulated as desired without any danger of damaging the bicycle, the less so as the non-skid cap is absolutely forced to rotate the driving wheel by its internal flutes.

I claim:—

A non-skid cap for the driving wheel on the electric dynamo for bicycles, comprising in combination with the bicycle tire cover and the driving wheel having teeth separated by gaps, a frustro-conical cap of elastic material having internal flutes adapted to engage into the gaps between the teeth of the driving wheel and external flutes adapted to engage on said bicycle tire cover, said frustro-conical cap adapted to be pulled over the driving wheel, an inwardly turned edge at the lower end of said cap securely holding the cap on the driving wheel, and allowing stretching of the cap when it is pulled over the driving wheel.

WILHELM SANDER.